United States Patent
Jagadish et al.

(10) Patent No.: US 6,351,753 B1
(45) Date of Patent: Feb. 26, 2002

(54) METHOD AND APPARATUS FOR ASYNCHRONOUS VERSION ADVANCEMENT IN A THREE VERSION DATABASE

(75) Inventors: Hosagrahar V. Jagadish, Ann Arbor, MI (US); Inderpal S. Mumick, Union County; Michael Rabinovich, Morris County, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/252,805

(22) Filed: Feb. 19, 1999

Related U.S. Application Data

(60) Provisional application No. 60/075,294, filed on Feb. 20, 1998.

(51) Int. Cl.$^7$ ................................................. G06F 17/30
(52) U.S. Cl. ........................ 707/203; 707/200; 707/206
(58) Field of Search ................................ 707/203, 200, 707/206

(56) References Cited

U.S. PATENT DOCUMENTS 5,280,612 A * 1/1994 Lorie et al. ..................... 707/8
5,778,388 A * 7/1998 Kawamura et al. ......... 707/203

OTHER PUBLICATIONS

Bober, P.M.; Cary, M.J., "On Mixing Queries And Transactions Via Multiversion Locking", Data Engineering, Proceddings. Eighth International Conference, pp. 535–545, 1992.*
C. Hohan, Hamid Pirahesh and Raymond Lorie, "Efficient and Flexible Methods for Transient Versioning of Records to Avoid Locking by Read–Only Transactions," ACM Sigmod, pp. 124–144, 1992.*
Kun–Lung Wu, Philip S. Yu and Ming–Syan Chen, "Dynamic, Finite Versioning for Concurrent Transaction and Query Processing," IBM Research Report RC 16633 (#728000), Mar. 1991.*
Arvola Chan and Robert Gray, "Implementing Distributed Read–Only Transactions," IEEE Trans. on Software Eng., vol. SE–11, No. 2, pp. 205–212, (Feb. 1985).
Arif Merchant, Kun–Lung Wu, Philip S. Yu and Ming–Syan Chen, "Performance Analysis of Dynamic Finite Versioning Schemes: Storage Cost vs. Obsolescence," IEEE Trans. on Knowledge and Data Eng., vol. 8, No. 6, pp. 985–1001, (Dec. 1996).

* cited by examiner

Primary Examiner—Jack Choules
Assistant Examiner—Cheryl Lewis
(74) Attorney, Agent, or Firm—Kenyon & Kenyon

(57) ABSTRACT

A method and apparatus is provided for asynchronous version advancement in a three version database. For a distributed database, read transactions are executed using a first version of a database. Update transactions are executed such that information is written into a second version of the database. The second version may include less than all of the information contained in the first version. A database version begins to be advanced at each node such that the information in the second version becomes available for read transactions. For an update transaction that starts on a node after the database version has been advanced, the update transaction is executed such that the update transaction writes information into a third version of the database. The advancement of the database version is completed such that the second version becomes the first version and the third version becomes the second version. For a centralized database, the protocol reduces of the number of versions from four to three.

24 Claims, 3 Drawing Sheets

METHOD AND APPARATUS FOR ASYNCHRONOUS VERSION ADVANCEMENT IN A THREE VERSION DATABASE

CROSS-REFERENCE TO RELATED APPLICATIONS

This application claims the benefit of U.S. Provisional Patent Application Ser. No. 60/075,294 entitled "Asynchronous Version Advancement in a Distributed Three Version Database" and filed Feb. 20, 1998 pending.

FIELD OF THE INVENTION

The present invention relates to information databases. More particularly, the present invention relates to a method and apparatus for asynchronous version advancement in a three version database.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

Databases often maintain multiple versions of data to avoid interference between read-only queries and update transactions. Many multi-versioning concurrency control protocols have been proposed, both for centralized and distributed databases. Examples of such proposals include: R. E. Stearns and D. J. Rosenkrantz, "Distributed Database Concurrency Controls Using Before-Values," ACM SIGMOD Conf. on the Management of Data, pp. 216–223 (1981) (referred to herein as "Stems and Rosenkrantz"); R. Bayer, H. Heller and A. Reiser, "Parallelism and Recovery in Database Systems, ACM Trans. on Database Systems 5(2), pp. 139–156 (1980) (referred to herein as "Bayer, Heller and Reiser"); A. Chan and R. Gray, "Implementing Distributed Read-Only Transactions," IEEE Transactions on Software Engineering, 11(2), pp. 205–212 (1985) (referred to herein as "Chan and Gray"); William E. Weihl, "Distributed Version Management for Read-Only Actions, IEEE Transactions of Software Engineering Vol. SE-13, pp. 55–64 (1987) (referred to herein as "Weihl"); A. Chan, Fox, W-T. K. Lin, A. Nori and D. R. Ries, "The Implementation of an Integrated Concurrency Control and Recovery Scheme," ACM SIGMOD Conf. n the Management of Data, pp. 184–191(1982) (referred to herein as "Chan et al."); C. Mohan, H. Pirahesh and R. Lorte, "Efficient and Flexible Methods for Transient Versioning of Records to Avoid Locking by Read-Only Transactions, ACM SIGMOD Conf. on the Management of Data, pp. 124–133 (1992) (refered to herein as "Mohan, Pirahesh and Lorte"); D. Agrawal and S. Sengupta, "Modular Synchronization in Multiversion Databases: Version Control and Concurrency Control," ACM SIGMOD Conf. on the Management of Data, pp. 408–417 (1989); and P. Bober and M. Carey, "On mixing Queries and Transactions via Multiversioning Locking, "Proc. 8th IEEE Intl. Conf. on Data Engineering, pp. 535–545 (1992) (refered to herein as "Bober and Carey").

Of special interest are protocols that satisfy the following three properties (collectively referred to herein as the "non-interference requirement"): (1) read-only queries are completely decoupled from updates; (2) a transaction is never delayed by version management; and (3) a read-only query does not need to acquire any lock, or write any control information, to an accessed data item (such writes basically turn the read-only queries into much heavier-weight updates). At the same time, it may not be critical that queries read the latest committed data, although read-only queries should not fall too far behind the updates.

This non-interference requirement eliminates from consideration many protocols, like the two-version protocols of Bayer, Heller and Reiser and Stems and Rosenkrantz, where interference between read and update transactions is still possible, and the protocol of Weihl, which requires read transactions to write read time-stamps to accessed data items.

Existing techniques that satisfy the non-interference requirement fall into two categories. Techniques belonging to the first category—such as Chan et al. and Bober and Carey (for centralized schemes) and Chan and Gray (for a distributed scheme)—may create a potentially unlimited number of data versions in the case of a long-running read transaction. Thus, read transactions incur the overhead of following a potentially unlimited chain of data version pointers to determine which version should be used. Moreover, in the distributed case of Chan and Gray, the set of sites that will be visited must be known in advance.

Techniques in the second category—such as Mohan, Pirahesh and Lorte; K. L. Wu, Philip S. Yu and M. S. Chen, "Dynamic, Finite Versioning for Concurrent Transaction and Query Processing," Technical Report RC 16633, IBM T. J. Watson Research Center (1991) (referred to herein as "Wu, Yu and Chen"); Merchant, Performance Analysis of Dynamic Finite Version Scheme: Storage Cost vs. Obsolescence," IEEE Transactions on Knowledge and Data, vol. 8 no. 6 (1996); and K. L. Wu, Philip S. Yu and M. S. Chen, "Dynamic Finite Versioning: An Effective Versioning Approach to Concurrent Transaction and Query Processing," Int. Conf. on Data Engineering (1993)—introduce a separate version advancement procedure to move from one version to another, and require four versions to satisfy the non-interference requirement in a centralized database. However, the extension to a distributed database discussed in Mohan, Pirahesh and Lorte requires version advancement to be coordinated with user operations: otherwise, autonomous version advancement may cause user operations to be aborted. Thus, the non-interference requirement is violated in the distributed case.

In view of the foregoing, it can be appreciated that a substantial need exists for an asynchronous version advancement protocol in a distributed three version database that satisfies the non-interference requirement and solves the problems discussed above.

SUMMARY OF THE INVENTION

The disadvantages of the art are alleviated to a great extent by a method and apparatus for asynchronous version advancement in a three version database. For a distributed database, read transactions are executed using a first version of a database. Update transactions are executed such that information is written into a second version of the database. The second version may include less than all of the information contained in the first version. A database version begins to be advanced at each node such that the information in the second version becomes available for read transactions. For an update transaction that starts on a node after the database version has been advanced, the update transaction is executed such that the update transaction writes information into a third version of the database. The advancement of the database version is completed such that the second version becomes the first version and the third version becomes the second version. For a centralized database, the protocol reduces of the number of versions from four to three.

With these and other advantages and features of the invention that will become hereinafter apparent, the nature of the invention may be more clearly understood by reference to the following detailed description of the invention, the appended claims and to the several drawings attached herein.

DETAILED DESCRIPTION

The present invention is directed to a method and apparatus for asynchronous version advancement in a three version database. An embodiment of the present invention, referred to herein as the Asynchronous Version Advancement in a Distributed Three Version Database (AVA3) protocol, provides a protocol for multi-version concurrency control in a distributed database. The AVA3 protocol creates no more than three versions of any data item, and provides that: (1) update transactions do not interfere with read-only transactions; (2) the version advancement mechanism is asynchronous with both update and read-only user transactions; and (3) read-only transactions do not acquire locks and do not write control information into the data items being read. This is an improvement over existing multi-versioning schemes for distributed databases, which either require a potentially unlimited number of versions or require coordination between version advancement and user transactions. The AVA3 protocol can also be applied in a centralized system, and one improvement over existing schemes is a reduction of the number of versions from four to three.

Figure 1:
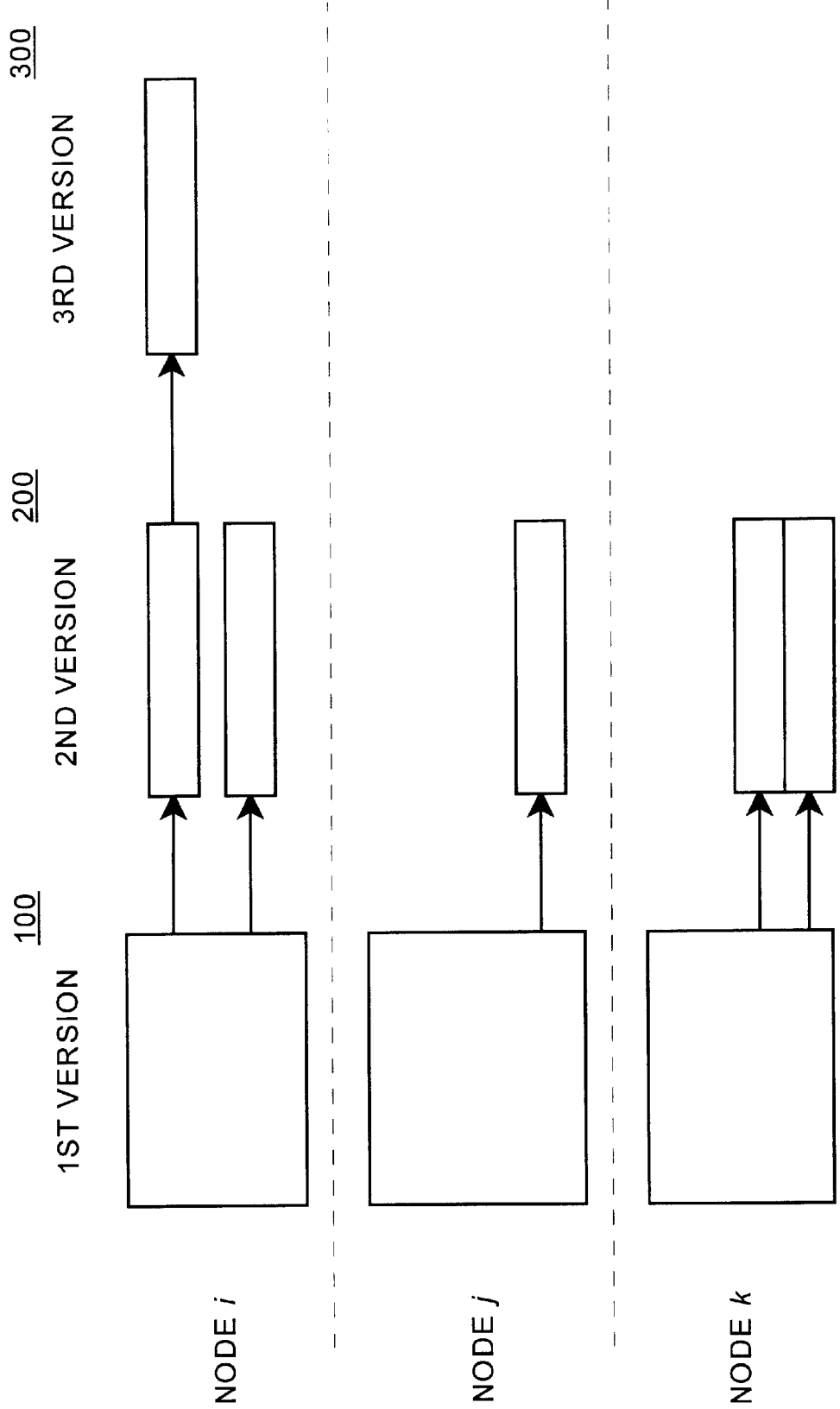
FIG. 1 illustrates the use of three database versions in a distributed database according to an embodiment of the present invention.

Referring now in detail to the drawings wherein like parts are designated by like reference numerals throughout, there is illustrated in FIG. 1 the use of three database versions in a distributed database according to an embodiment of the present invention. As shown in FIG. 1, the non-interference requirement is satisfied with only three versions 100, 200, 300 in a distributed database. Further, one of the three versions is transient, and the protocol is relatively simple in comparison to existing schemes. The AVA3 protocol uses two-phase locking for concurrency control of update transactions, and read transactions do not acquire any locks. Instead, read transactions are serialized with respect to updates by using appropriate data versions.

The AVA3 protocol may be contrasted with manual version management which is routinely performed by database administrators. In manual versioning, the data is kept in two separate copies, one for operational support and one for read-only queries (decision support, auditing, etc.). Periodically, updates accumulated in the operations support copy are flushed to the read-only copy of the data. Access to the read-only data is blocked during the flushing process. Typical examples of manual versioning are database applications for telephone calls or credit card transactions, where it is used to decouple customer access to telephone call (or credit card) transactional data from the support for completing, processing, and collecting telephone call (or credit card) transactions. The read-only copy is used for customer inquiries while the operations support copy is used to record current calls and transactions activity.

The AVA3 protocol achieves the same functionality as above, but without requiring two full copies of the data, and without blocking access to the read-only copy. The AVA3 protocol normally maintains one full copy 100 of the database and one partial (perhaps empty) update copy 200, to which all update transactions write any data objects they modify. Read transactions access the main copy 100. Update transactions read either the update copy 200 of the data (if it exists) or the main copy 100 (otherwise). Periodically, a version advancement protocol runs to make newer data available to reads. Version advancement may be triggered by the system due to a variety of reasons.

For instance, versions may be advanced every hour, or when a certain number of update transactions have accumulated, or when the difference in value of data items in the read and update copies exceeds some threshold, or after an update transaction of a particular kind commits. Each node keeps two numbers (a query version number and an update version number) corresponding to the read and (possibly non-existent) update copies of each data item at the node.

The version advancement protocol starts by asynchronously promoting the update version number on each node. Update transactions that start on a node after it promoted its update version number write modified data into a new third copy 300. During a given instance of version advancement execution, an update transaction T that started on a node before its update version number was advanced continues to use the second copy 200, until it needs to access a data item for which the third copy 300 already exists. This can happen, for example, if the data item has been updated by a concurrent transaction that started and committed after the node had incremented its update version number. In this case, transaction T switches to the third copy 300. To do that, all updates already executed by this transaction are transferred from the old (second) copy 200 to the new (third) copy 300. According to an embodiment of the present invention, a moveToFuture function takes care of this without restarting the transaction or obtaining any locks. Similarly, at commit time, it may be discovered that an update transaction used different version numbers at different nodes.

Such cases are dealt with by modifying the steps of the two phase commit protocol: with the prepare message, each subtransaction includes the version number it used by the time it reached the prepared state. The commit coordinator takes the maximum of the reported version numbers and distributes it with the commit message. When a participant receives the commit message with a version number exceeding the one used by the subtransaction, it performs the moveToFuture function.

Once all nodes promote their update version number, no version mismatch will occur for new update transactions. As soon as existing update transactions, which started with the old update version number, all finish, the second copy of the database on all nodes are mutually consistent, and read transactions can be allowed to use this copy. This is done by promoting, again completely asynchronously, the read version number on all nodes. A read transaction that starts on a node after it promoted its read version number uses the second copy for all its data accesses. If at the start time, the node still has the old read version number, the first copy 100 is used.

When it is detected that all read transactions using the first copy 100 of the data have finished, this copy can be garbage-collected with no danger that it will be needed. This completes the version advancement process, leaving the system with at most two copies of the data again.

Thus, the AVA3 protocol for distributed databases uses at most three versions to decouple read and update transactions while providing that (1) read transactions never interfere with update transactions, (2) the version advancement mechanism is completely asynchronous with user transactions, and (3) read transactions do not require any locks and do not update any information in the data items they access. The read transactions are allowed to increment some main memory counters associated with the node using latches (no locks). For the centralized case (that is, when there is only one site) the AVA3 protocol reduces the number of versions needed to provide the non-interference requirement from four versions—as disclosed in Mohan, Pirahesh and Lorte and Wu, Yu and Chen—to three versions, even when uncommitted updates are allowed to be written into the database.

Moreover, the AVA3 protocol is relatively simple and light-weight. It does not require maintaining and manipulating the completed transaction lists (as in Chan and Gray), or lists of update transactions that accumulated since last version advancement (as in Mohan, Pirahesh and Lorte), or a transaction dependency graph (as in Bayer, Heller and Reiser), or lists of active read and update transactions (as in Wu, Yu and Chen). Instead, the AVA3 protocol maintains only a few integers per node and two integers per transaction, in addition to standard data structures for accessing data in desired versions. The AVA3 protocol achieves these results by allowing read transactions to access a snapshot of the data that may not include the most recent information. By running frequent version advancements in the background, the staleness of the snapshot used by a read transaction Q can be limited to the age of the longest-running read transaction that was executing at the time Q started.

Update transactions are assumed to use strict two-phase locking, i.e., they lock every data item they access on a node. They release shared read locks up on sending the prepare message to the coordinator of the commit, and release exclusive write locks up on receiving a commit message from the coordinator. A shared lock on a data item means that other update transactions can read but not write any version of the data item. An exclusive lock on a data item means that no other update transaction can read or write to any version of the data item. Query transactions do not obtain any locks, so they can read appropriate versions of a data item that is locked by an update transaction.

The model of user transactions follows the R* system disclosed in C. Mohan, B. Lindsay and R. Obermark, "Transaction Management in the * Distributed Database Management System," ACM Transactions on Database Systems, 11(4), pp. 378–396 (1986) (referred to herein as "Mohan, Lindsay and Obermark"). An update transaction is submitted to one server first, which becomes the root of the transaction. It executes a root subtransaction and then sends children subtransactions to other nodes if necessary. When a subtransaction is done, the server sends a Prepared message to the parent, and waits for the Commit. Prepared messages propagate to the root, which makes a decision on whether to commit the transaction. If the decision is to commit, it sends the Commit message to the nodes to which it sent subtransactions. These nodes commit their subtransactions, and send the Commit message further down.

Read transactions, or "queries," also follow the tree model of execution. A query is submitted to the root, which sends descendent subqueries to other nodes. When a sub-query completes, it waits for the results of its descendant subqueries, incorporates them into its own results and sends them to its parent and commits. When a root subquery and all its children subqueries are finished, the root sub query returns the results to the user. Assume there are n nodes in the distributed system, labeled 1, ... i, j, k, ... n. Upper case letters Q, S, and T refer to transactions in the system. The subtransaction of transaction T at node i is referred to as $T_i$. Lower case letters, x, y, and z are used to refer to data items. For example, x(v) denotes the value of x in version v, if x exists in version v (or else it is undefined), and maxV(x) denotes the maximum version in which data item x exists.

A more detailed description of the AVA3 protocol according to one embodiment of the present invention will now be provided.

AVA3 Protocol

The AVA3 protocol builds up on two phase locking for local concurrency control and two phase commit for distributed commitment. The protocol specifies the versions to be accessed by each read and update subtransaction, how to advance the versions so that more current data is read by subsequent subtransactions, and how to garbage collect old versions of data items. Each data item can exist in at most three versions. According to one embodiment of the present invention, version numbers increase monotonically with time. According to another embodiment, old version numbers are re-used employing only three distinct numbers. Note that data structures and indices can be built such that the following questions can be answered efficiently: (1) does data item x exist in version v? and (2) what is the maximum existing version of x? Techniques to build such indices are discussed in Mohan, Pirahesh and Lorte.

Control State and Subroutines

Figure 2:
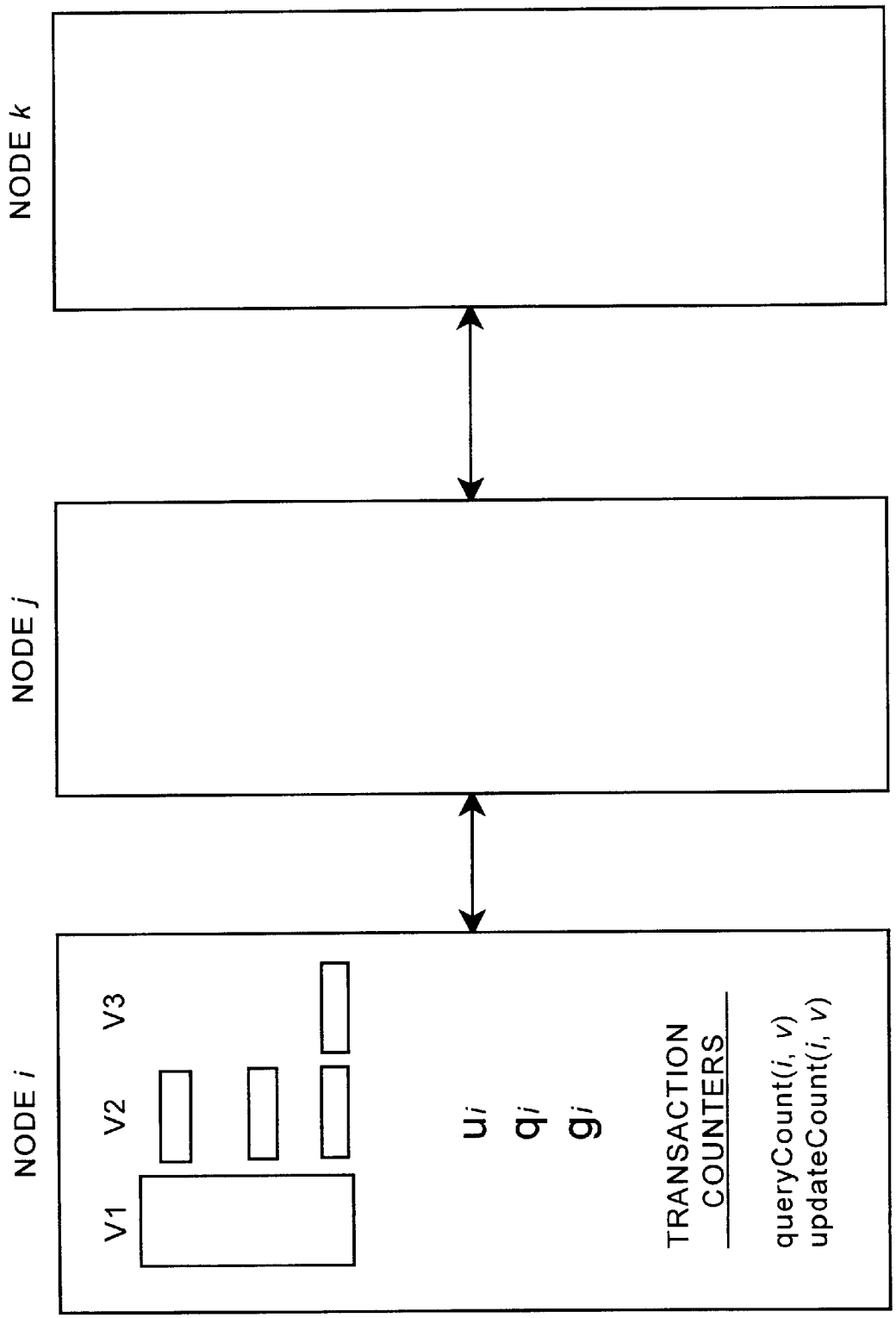
FIG. 2 is a more detailed view of a distributed database according to an embodiment of the present invention.

With respect to the control state, refer now to FIG. 2 which shows a more detailed view of a distributed database according to an embodiment of the present invention. Each node in the distributed database, or "site," such as node i, maintains the following three variables:

$u_i$ represents an "update version number," or the version of data to be updated by any new update subtransaction at node i;

$q_i$ represents a "query version number," or the version of data to be read by any new query starting at node i; and $g_i$ represents a "garbage version number," or the version number of data that can be, or has been, garbage-collected.

Site i also maintains two counters for each active version number it has, a query counter queryCount(i, v), and an update counter updateCount(i, v). These counters, together referred to as "transaction counters," indicate the number of query or update subtransactions in progress at node i that started execution by accessing data in version v. According to one embodiment of the present invention, transaction counters may be maintained in main memory only, allowing for lightweight updates that do not involve disk access, logging, or even locking. As a consequence, the counters may be lost upon a system crash. In this case, the counters may start out with an initial value of 0 on after-crash recovery, since all transactions in progress are aborted in the recovery process.

Each query and update subtransaction $T_i$ maintains a version number $V(T_i)$, called the version of $T_i$, which specifies the version of the data currently being accessed. For update subtransactions, $V(T_i)$ may change during the execution. Consequently, each update subtransaction also maintains the starting value of $V(T_i)$, denoted $startV(T_i)$, and called the starting version of $T_i$. Version numbers associated with a subtransaction may also be maintained in main memory.

Thus, on a node i, the query counter queryCount(i, v) is equal to the number of active query subtransactions for which $V(Q_i)=v$. The update counter updateCount(i, v) is equal to the number of active update subtransactions for which $startV(T_i)=v$. At start-up time, all records exist in a single version 0, and for each node i, $q_i=0$, $u_i=1$, updateCount(i, 0)=updateCount(i, 1)=queryCount(i, 0)=queryCount(i, 1)=0.

Deletions of Data Items

With respect to the deletions of data items, the deletion of a data item y in version v is modeled by simply marking y as deleted in version v, without removing the object, unless v is the only version of the object in the system. Subsequently, when all earlier versions of y are garbage-collected from the system, the data item y can be removed from version v as well.

moveToFuture

To switch an active update subtransaction $T_i$ from accessing version $oldV=V(T_i)$ to a new version newV, at some node i, a moveToFuture($T_i$, newV) is used. The purpose of this function is to bring the database at node i to a state the database would have if $T_i$ never touched any data items in version oldV, and instead had operated all along with version newV. The moveToFuture implementation does not involve aborting and replaying $T_i$, or acquiring any locks, and, therefore, never delays (nor is delayed by) other transactions. In other words, moveToFuture does not introduce hidden synchronization between version advancement and user transactions.

Version Advancement and Garbage Collection

Reads are assumed to occur on a common query version oldq, and updates on a common update version oldu at each node in the distributed database. Version advancement is meant to move the system forward by creating a temporary third version.

Any node can initiate version advancement, thus becoming the coordinator of version advancement, provided it does not participate in version advancement already. Correctness of the protocol does not depend on having a single coordinator—it is possible for multiple nodes to initiate version advancement independently. However, coordinators advance the system to the same new update and read version numbers. In other words, the system does not advance to different versions at the same time.

The basic strategy for version advancement is to make new update transactions update a new version newu=oldu+1, wait for old update transactions on version oldu to finish, then make new query transactions read data in version newq=oldu=oldq+1, wait until queries on version oldq complete, and finally garbage collect version oldq.

A node k may initiate version advancement only if $u_k=g_k+2$ and all data in version $g_k$ has been garbage-collected, which indicates it is not in the process of version advancement already. Let $oldu=u_k$, $oldq=q_k$, and $oldq=g_k$ be update, read, and garbage version numbers before k starts version advancement.

Figure 3:
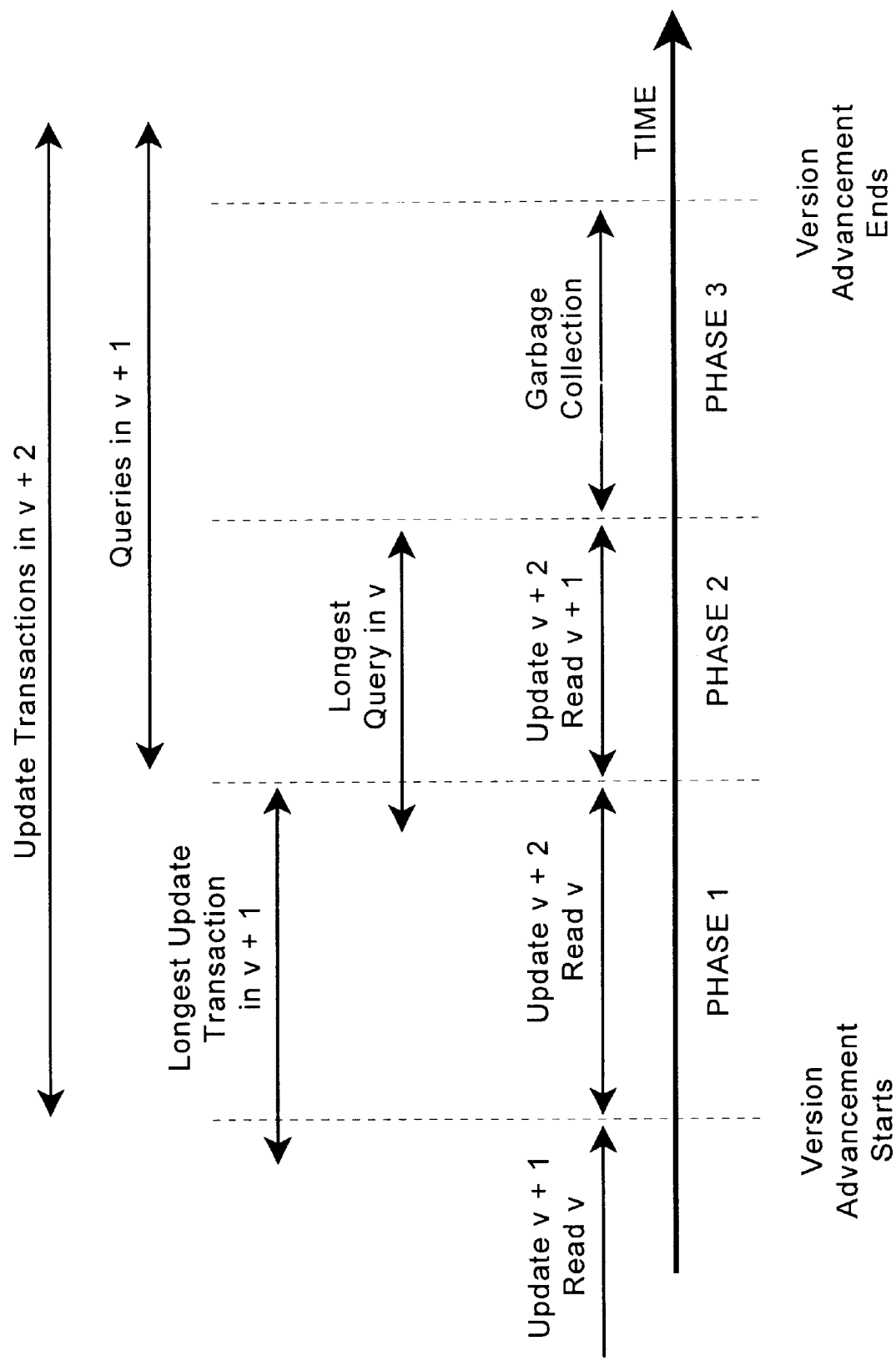
FIG. 3 is time line showing three phases of version advancement according to an embodiment of the present invention.

According to an embodiment of the present invention, version advancement is executed in three phases, were are illustrated in FIG. 3 and described in detail below.

Phase 1: Switching to a New Update Version

Node k determines the new update version number newu=$u_k$+1, and sends a message advance-u with the new update version number newu to every node, including itself.

Each node i receiving message advance-u(newu) executes the following steps according to an embodiment of the present invention:

IF ($u_i$<=newu)
        IF ($g_i$<newu-3)
            $g_i$=newu-3
            garbage-collect data of version $g_i$ (see Phase 3)
        IF ($u_i$<newu)
            $u_i$=newu
            updateCount(i, newu)=0
        wait until updateCount(i, newu-1)=0
        send ack-advance-u(newu) to node k
    terminate Each node i receiving this message compares its update version number, $u_i$, with newu. If $u_i$>newu, this version advancement message is obsolete (i already advanced its version beyond that), and the message is simply ignored. If $u_i$<newu, node i sets $u_i$=newu, so that all subsequent update subtransactions at node i execute on version newu, and allocates and initializes the update counter updateCount(i, newu)=0. If $u_i$=newu, it means that node i has already initiated version advancement to newu (because it heard about advancement already from some other node, or because a different coordinator also initiated this version advancement).

In either case, node i waits until all local update subtransactions that started before i switched to newu finish. Node i detects that all these subtransactions finished when update-Count (i, newu-1)=0. Once this condition is true, i sends an acknowledgment ack-advance-u to the coordinator. To identify which version advancement operation is being acknowledged, the acknowledgment carries newu.

Also, if i's garbage version number is less than newu-3, this means that i has not finished Phase 3 of another instance of version advancement with coordinator different from k. In this case, i infers that k has already garbage-collected all versions up to newu-3 (otherwise, it could not have initiated new version advancement), and therefore it is safe for i to do so also. Thus, i sets $g_i$=newu-3 and garbage-collects this version of the data (see Phase 3).

The coordinator collects acknowledgments from all the nodes. Once every node has confirmed initiating version advancement: (a) all new update subtransactions will update data in version newu and (b) all updates on version oldu are complete, and version oldu is stable. The coordinator now initiates Phase 2.

Due to the possibility of multiple coordinators, k may act as the coordinator of one version advancement operation and a participant in other instances of the protocol execution. Therefore, while waiting for ack-advance-u(newu), k may receive a message advance-q (newq) from another coordinator executing Phase 2 of the AVA3 protocol. In this case, k stops executing the current protocol and ignores any ack-advance-u(newu) messages, both the ones already received and the ones it may receive in the future.

Phase 2: Switching to a New Query Version

The coordinator determines the new query version number newq=q k+1 and sends a message advance-q with the new query version number newq to every node, including itself. Each node i receiving this message compares its $q_i$ with newq. According to an embodiment of the present invention, each node i receiving this message executes the following steps:

```
IF (q_i<=newq)
    IF (q_i<newq)
        q_i=newq
        updateCount(i, newq-1)=0
        wait until updateCount(i, newq-1)=0
        send ack-advance-q(newq) to node k
    terminate
```

Similar to Phase 1, i ignores the message if $q_i$>newq. If $q_i$=newq, node i has already switched to a new query version. If $q_i$<newq, node i increments $q_i$ to be equal to newq, so that all new queries at node i are executed against the version newq, and allocates and initializes the query counter queryCount(i, newq)=0. In either case, i waits for all existing queries that are reading data of version oldq= newq−1 to terminate by checking if queryCount(i, oldq)=0, and sends an acknowledgment ack-advance-q(newq) to the coordinator.

Once all acknowledgments arrive, the coordinator starts Phase 3. Again, while waiting for ack-advance-q(newq) messages, k may receive a message garbage-collect(newg) from another coordinator executing Phase 3 of this protocol. In this case, k stops executing the current protocol and ignores any ack-advance-q(newq) messages that it has received or will receive in the future.

Phase 3: Garbage Collection

The coordinator sends a garbage-collect(newg) message to all nodes. Upon receiving the garbage collection message, a node i executes the following steps according to an embodiment of the present invention:

```
IF (g_i<newg)
    g_{i=newg}
    FOR each x
        IF x exists in version q_i
            purge version g_i of x
        ELSE
            assign version number q_i to version g_i of x
    purge queryCount(i, oldq) and updateCount(i, newq)
    terminate
```

Node i compares newg received with its garbage version number, $_{gi}$. If $g_i$>=newg, this garbage-collect message is ignored. Otherwise, node i sets $g_i$=newg and garbage-collects the data of this version as follows. For every data item x, if x exists in version $q_i$=newq, node i garbage-collects the earlier version $g_i$=newg=oldq of x. If data item x does not exist in version newq, this means it was never updated in this version, since the protocol does not create a new version of data until it is first updated by a transaction running in this version.

Consequently, in this case, node i changes the number of oldq version of x to version newq. Note that if x was deleted in version newq=oldu, it would still physically exist in this version albeit be marked deleted. This prevents deleted data from re-appearing during this garbage-collection algorithm.

Once i completes garbage collection of version newq, it can again initiate version advancement. If it does, it will have newu'=$u_i$+1=newu+1. At this point, some nodes that participate in "old" version advancement initiated by k may have not yet received garbage-collect(newg) message from k. If a node j receives message advance-u(newu') from i before message garbage-collect(newg) from k, node j may still have query version oldg<newu'−3. As already mentioned in Phase 1, j infers in this case that i has already garbage-collected all versions up to newu'−3 and therefore it is safe for j to do so also.

Read-Only Transactions

The protocol for executing a subquery $Q_i$ of query Q on node i, according to an embodiment of the present invention, is as follows.

1. If $Q_i$ is the root, execute the following two steps atomically:
   Set $V(Q_i)$=$q_i$.
   Increment query counter queryCount (i, $V(Q_i)$) indicating that one more query subtransaction is executing against version $V(Q_i)$.

2. If $Q_i$ is not a root, it is assigned a version number $V(Q_i)$ by its parent (see Step 4 below). Then, simply increment the query counter queryCount(i, $V(Q_i)$). If $V(Q_i)$>$q_i$, it means that version advancement to the new query version has begun, but node i has not yet received the advance-query-version message from the coordinator. In such a case, node i initiates advancement of the query version (sets $q_i$=$V(Q_i)$, and initializes queryCount(i, $V(Q_i)$)=0) before doing the above actions.

3. If $Q_i$ reads a data item x, read the maximum existing version of x not exceeding $V(Q_i)$. According to an embodiment of the present invention, no locks are obtained. If desired, a short-term latch may be obtained.

4. If $Q_i$ creates child subtransactions, assign them a version number equal to $V(Q_i)$, and send them to their respective destination nodes.

5. When all data items have been read and the results from all descendant sub queries have arrived, compose the results of $Q_i$, and sends them to the parent (if $Q_i$ is a non-root), or to the user (if $Q_i$ is the root), decrement queryCount(i, $V(Q_i)$), and commit.

Update Transactions

The protocol is the same for root and descendant update subtransactions. A subtransaction $T_i$ starts at node i by looking up the update version number $u_i$ at the node, and using it as its starting and current version number. While subtransaction $T_i$ is executing, it is possible that a version advancement process increments the update version number at node i. An update subtransaction $S_i$ starting later may thus have a starting version number startV($S_i$)=startV($T_i$)+1, and may update a data item x in version startV($S_i$) and commit. If $T_i$ later wants to access data item x, it is serialized after subtransaction $S_i$. This is accomplished by moving all updates of $T_i$ from its current version into a new version v (using the moveToFuture function) any time $T_i$ accesses a data item that exists in version v>V($T_i$). The current version of the transaction is also advanced to v.

Note that while subtransaction $T_i$ updates on version $u_i$ at node i, another subtransaction $T_j$ of the same transaction T may perform updates on version $u_j$=$u_i$+1 at node j, if node j has started version advancement, but node i has not started version advancement. This discrepancy can be caught at commit time, during the two phase commit protocol. The whole transaction T is then made to commit in version $u_j$, which means that all updates performed by $T_i$ in version $u_i$=$u_j$−1 are moved up to version $u_j$ (using the moveToFuture function).

With this background, the protocol according to an embodiment of the present invention is listed below:

1. When starting a subtransaction $T_i$, a site i executes the following two steps atomically:
   Set V($T_i$)=startV($T_i$)=$u_i$.

Increment the update counter updateCount(i, startV($T_i$)) for version startV($T_i$).
2. To read a data item x, $T_i$ executes the following steps:
   Get a shared lock on x
   curVersion=maxV(x)
   IF (curVersion>V($T_i$))
       moveToFuture($T_i$, $u_i$)
       V($T_i$)=$u_i$
   Read x(curVersion)
3. To write a data item y, $T_i$ executes the following algorithm:
   Obtain an exclusive lock on y
   curVersion=maxV(y)
       IF (curVersion>V($T_i$))
           moveToFuture($T_i$, $u_i$)
           V($T_i$)=$u_i$
       ELSE IF (curVersion<V($T_i$))
           Create y in version V($T_i$) by copying y(max(y)).
       Update y(V($T_i$)).
4. If subtransaction $T_i$ creates child subtransactions, send these to their respective destination nodes.
5. If subtransaction $T_i$ with no children completes, send a message prepared (V($T_i$)) to the parent subtransaction.
6. If subtransaction $T_i$ with child subtransactions completes, wait to receive prepared messages from its children subtransactions.
7. When a subtransaction $T_i$ with child subtransactions receives the prepared ($v_j$) messages from all its children, it computes a global version of $T_i$ V($T_i$), which is equal to the maximum of V($T_i$) and the version numbers received with the prepared messages from its children. If $T_i$ is not root, it sends a prepared (V($T_i$)) message to its parent subtransaction.
   If $T_i$ is the root subtransaction, then V($T_i$) is the global version of the transaction, V(T)=V($T_i$), and is the largest version number updated by any subtransaction of the transaction. The root subtransaction $T_i$ decides whether to commit the transaction, and if so, sends a commit (V(T)) to itself and its children subtransactions.
8. When a subtransaction $T_i$ receives the commit (V(T)) message, it checks whether or not its version V($T_i$) is equal to V(T). If V($T_i$)=V(T), it means that $T_i$ updated the correct version of data items, and the subtransaction can commit. As part of the commit process, $T_i$ decrements updateCount(i, startV($T_i$)), and sends a commit (V(T)) message to each of its children.
   If V($T_i$)<V(T) 1, it means that $T_i$ updated an earlier version of data items than some other subtransactions of the same transaction T, and it now needs to move its updates into the later version V(T). Note that V($T_i$) can be less than V(T) by at most 1.
   At this time, two cases are possible: (1) $u_i$=V(T), meaning that version advancement has begun at node i; or (2) $u_i$=V($T_i$)=V(T)−1, meaning that version advancement has not begun at node i. In the latter case, version advancement is initiated, by treating the receipt of the commit (V(T)) message as a signal to start version advancement. In this case, $u_i$ is incremented and updateCount (i, V(T)) is initialized to 0.
   Once it is ensured that version advancement is taking place ($u_i$=V(T)), moveToFuture($T_i$, V(T)) is executed to move subtransaction $T_i$ into the global version V(T). Having done so, $T_i$ commits, decrements updateCount (i, startV ($T_i$)), and sends a commit (V(T)) message to each of its children.

moveToFuture Function

Function moveToFuture ($T_i$, newV) switches an active update subtransaction $T_i$ at node i from accessing version oldV =V($T_i$) to a new version newV. This function brings the database on node i to a state the database would have if $T_i$ never touched any data items in version oldV, and instead had operated all along with version newV.

The actions performed by moveToFuture may depend on the log and recovery scheme used. If any of the no-undo, otherwise known as "no-steal," schemes—as discussed in P. A. Bernstein, V. Hadzilacos and N. Goodman, "Concurrency Control and Recovery in Database Systems," (Addison-Wesley, 1987) (referred to herein as "Bernstein et a.")—are employed, the only action required of moveToFuture is to update the current version number of the subtransaction: V($T_i$)=newV. Indeed, to avoid undoing any updates, these schemes apply updates to the actual database only at commit time, for active transactions, updates are kept in redo log records (for redo/no-undo schemes) or in temporary shadow copies (for no-redo/no-undo). Since the AVA3 protocol ensures that moveToFuture is only performed by uncommitted transactions, promoting transaction version numbers is sufficient to achieve the desired effect that transactions commit to their final version and have no effect on earlier versions. In addition, the final version number of $T_i$ is included in the commit log so that, during recovery, $T_i$'s log records are applied to the proper version.

In the recovery scheme of Phillip Bohannon, J. Parker, Rajeev Rastogi, S. Seshadri, Avi Ailberschatz and S. Sudarshan, "Distributed Multi-Level Recovery in Main Memory Databases," Proc. 4th Int. Conf. on Parallel and Distributed Information Systems (PDIS) (1996) (referred to herein as "Bohannon et al."), active (non-committed) transactions are allowed to modify the database pages. However, the scheme ensures that, except during checkpoints, all modified pages as w ell as all undo log records of un-committed transactions remain in main memory. According to an embodiment of the present invention, moveToFuture, while more complex than in the previous schemes, can still be implemented efficiently, without any disk accesses in most cases. The likelihood of disk accesses during moveToFuture can be further reduced by coordinating checkpoint and version advancement operations, so that they are not done at the same time. Given that checkpoints of Bohannon et al. do not interfere with user transactions, such coordination does not introduce any hidden synchronization between version advancement and user transactions.

In this case, moveToFuture($T_i$, newV) reads log records from the tail of the log backwards, looking for records generated by $T_i$. For each redo record redo($T_i$, x), version newV of data item x is created by copying it from version oldV (recall that version oldV is still in main memory). For each undo record undo ($T_i$, x), this record is applied to version oldV of x, thereby undoing the effect of $T_i$ on this version. The function completes when it encounters the begin-transaction log record for $T_i$.

Note that moveToFuture achieves its goal by simply copying data items involved from the old to new version, not by aborting and restarting $T_i$. It is able to do that because each such data item has been locked by $T_i$ by the time moveToFuture is invoked. In particular, none of these data items already exist in the new version due to another transaction. Thus, copying into the new version will not overwrite updates of other transactions.

The implementation of moveToFuture is similar for other redo/undo recovery schemes, such as the "Aries" scheme described in C. Mohan, D. Haderle, B. Lindsay, H. Pirahesh and P. Schwartz, "Aries: A Transaction Recovery Method Supporting Fine-Granularity Locking and Partial Roll-Backs Using Write-Ahead Logging," ACM Transaction Database Systems (TODS), 17(1), pp. 94–162 (March 1992). However, without special optimizations to logging along the lines of Bohannon et al., moveToFuture within Aries is more likely to involve disk accesses. Therefore, in situations where version advancement is executed frequently, the scheme of Bohannon et al. or no-undo schemes should be used.

EXAMPLE EXECUTION

Consider a distributed database with three sites i, j, and k, with data items w at i, x and y at j, and z at k. Initially, all the data is at version 0, and so are all the transaction counters. The current read version at each node is 0, and update version is 1. However, there is no data in version 1 as of yet.

Now consider a sequence of actions as shown in Table I, involving update transactions S, T and U, and read-only queries P, Q and R. In Table I, $T_i$ denotes a subtransaction of transaction T at node i.

TABLE I

Example Execution Sequence for AVA3 protocol

| $T_i$me | Site i | Site j | Site k |
|---|---|---|---|
| 1 | Update transaction T arrives; startV($T_i$) = v($T_i$) = 1; updateCount (i, 1) = 1 | | |
| 2 | T locks w; creates and updates w(1). | | |
| 3 | $T_j$ and $T_k$ are issued to j and k. | | Version advancement is initiated; newu = $u_k$ + 1 = 2. |
| 4 | Query R arrives; querycount(i, 0) = 1. | $T_j$ arrives; startV($T_j$) = V($T_j$) = 1; updateCount(j, 1) = 1. | Send advance-u(2) to i, j, k. |
| 5 | R reads w(0). | Update transaction S arrives; startV(s#) = V($S_j$) = 1; updateCount(j, 1) = 2 | Set Uk = 2; send ack-advance-u(2) back to itself |
| 6 | R completes; querycount(i, 0) = 0. | | $T_k$ arrives; startV($T_k$) = ($T_k$) = 2; updateCount(k, 2) = 1. |
| 7 | Message advance-u(2) received, $u_i$ = 2. | Message advance-u(2) received, $u_j$ = 2. | $T_k$ locks z; creates and updates z(2). |
| 8 | | Update transaction U arrives; updateCount(j, 2) = 1. | $T_k$ completes and sends Prepared(2) message to parent T. |
| 9 | | U locks x; creates and updates x(2). | |
| 10 | | U commits; updateCount (j, 2) = 0. | |
| 11 | | $T_j$ locks y; creates and updates y(1). | |
| 12 | | S attempts to lock y, and waits. | |
| 13 | | $T_j$ locks x and updates x(2). | |
| 14 | | $T_j$ executes moveToFuture, by copying y to version 2 and undoing its update on y(1); V($T_j$) = 2. | |
| 15 | | Query Q arrives; queryCount(j, 0) = 1. | |
| 16 | | Q reads x(0). | |

TABLE I-continued

Example Execution Sequence for AVA3 protocol

| $T_i$me | Site i | Site j | Site k |
|---|---|---|---|
| 17 | | $T_j$ completes and sends Prepared(2) message to parent T. | |
| 18 | T receives Prepared messages from $T_j$ and $T_k$; T executes moveToFuture by copying w to version 2 and undoing its change to w(1). | | |
| 19 | T commits and sends Commit(2) message to $T_j$ and $T_k$; updateCount(i, 1) = 0 Send ack-advance-u(2) to k. | | |
| 20 | | $T_j$ receives Commit(2) and commits; updateCount(j, 1) = 1. | $T_k$ receives Commit(2) and commits; updateCount(k, 2) = 0. |
| 21 | | S locks y and updates y(2). S performs a trivial moveToFuture; V($S_j$) = 2. | |
| 22 | | S commits; updateCount(j, 1) = 0; send ack-advance-u(2) to k. | |
| 23 | | | All ack-advance-u(2) received; read version advancement starts; new q = q + 1 = 1; send advance-q(1) to i, j, k. |
| 24 | | advance-q(1) received; $q_j$ = 1. | |
| 25 | | Query P arrives; queryCount(j, 1) = 1. | Send ack-advance-q(1) to itself. |
| 26 | advance-q(1) received; $q_i$ = 1. | P reads y(1). | |
| 27 | Send ack-advance-q(1) to k. | P completes; queryCount(j, 1) = 0. | |
| 28 | | Q reads y(0) | |
| 29 | | Q completes; queryCount(j, 0) = 0. Send ack-advance-q(1) to k. | |
| 30 | | | All ack-advance-q(1) received; garbage collection of version 0 starts. |

A few interesting features of the execution in Table I should be noted. Transaction T starts out in version 1 on node i and performs all updates on node i in version 1, but performs all updates on node k in version 2. On node j, it starts using version 1 but moves to version 2 as soon as it encounters data item x that exists in version 2 (at time 13).

The existence of x in version 2 indicates that x was updated by a version 2 transaction that already committed (it committed because otherwise it would still hold the lock on x, preventing T from accessing x). This version 2 transaction conflicts with T, since both update x. Moreover, T cannot be serialized before this transaction because the version of x written by it does not reflect T's updates. Therefore, T is serialized after this transaction, which it accomplishes by moving to version 2 and then updating x in version 2. Note that T's access to y at time 11 is in version 1 even though version advancement has begun on node j—at this point T has not yet developed a conflict with any version 2 transactions.

On node i, T never encounters a version 2 data, and therefore executes completely in version 1. This version mis-match is discovered at commit time, and T moves its updates to version 2 on i prior to committing.

Read transactions do not obtain locks, and always see a consistent picture of the data. Read transaction P at time 26 reads version 1 of y, whereas read transaction Q only a few moments later, at time 28, reads version 0 of y.

Properties of the AVA3 Protocol

It should be noted that a schedule produced by the AVA3 protocol is equivalent to some serial schedule in which transactions are partially ordered by their version number, and within transactions of the same version number, the update transactions precede the read transactions. That is, the AVA3 protocol produces a globally serializable schedule of transactions.

It should also be noted that, using the AVA3 protocol, modulo latches on counters and version numbers, (a) read subtransactions are delay-free (they cannot be delayed by any other queries, updates or version advancement), (b) updates subtransactions are block-free with respect to read transactions and version advancement (the only possible delay to an update subtransaction due to version advancement is the time to execute a moveToFuture function), and (c) version advancement is starvation-free (that is, it cannot be delayed indefinitely by newly arrived transactions).

AVA3 Protocol in a Centralized System

The AVA3 protocol becomes much simpler for a centralized system. According to an embodiment of the present invention, version advancement still goes through the same multiple phases, but only at a single node: increment the update version counter, wait until no update transactions are operating on the old update version, increment the read version counter, wait until no query transactions are reading the old read version, and finally garbage collect the old versions.

Read transactions do nothing special. Update transactions operate as in the distributed case, copying to the current version whenever they update a data item for which the latest version is outdated, and applying the moveToFuture function whenever they encounter a data item with a version later than their own. However, there is no distributed commitment, so an update transaction can simply commit when it completes. Thus a simple centralized protocol performs asynchronous version advancement and provides that no more than 3 versions of a data item are ever created at a time.

Limiting Data Staleness

According to one embodiment of the present invention, the AVA3 protocol runs periodic version advancements to make more recent data available to queries. However, the way the protocol is described, the query able data may never be absolutely up-to-date. In other words, while version advancements make increasingly fresher data available for reads, this data may never catch up with the newest data.

Assume for simplicity that message delivery times are negligible compared to the transaction execution times. Consider a timing diagram of version advancement shown in FIG. 3, where initially the read version number is v and update version number is v+1 on all nodes. Then, after the version advancement begins, it makes data in version v+1 available for reads after the longest update transaction, which was active when this version advancement started, completes. During this time, new update transactions, by creating and modifying data in version v+2 can make data in version v+1 obsolete. Thus, when data in version v+1 becomes available for reads, it may be already behind the newest data. The lag, however, is bounded by the duration of the longest update transaction that was active at the time the version advancement started.

According to one embodiment of the present invention, this lag can be reduced using the following optimization of the AVA3 protocol. When a node starts the first phase of version advancement, normally the node must wait for all update transactions currently in progress to complete before moving to the second phase. To reduce this lag, the node may require all update transactions to execute a moveToFuture. When an update subtransaction executes the moveToFuture function at a site i, it is possible for it to decrement the update counter for its start version number, and increment the update counter for its new current version number immediately after rolling back updates in the old version. For the purpose of version advancement, the update transaction then appears to have "started" in the advanced version at the node. Thus, Phase 1 of the protocol can complete without waiting for a long-running update transaction that started in the old version to finish. The duration of Phase 1, which determines the maximum lag above, becomes limited to the time needed by all transactions that were active when version advancement started to execute moveToFuture.

As already mentioned, with appropriate optimizations of recovery scheme employed, moveToFuture is either a virtual no-op (if a no-undo recovery scheme is used) or it can be done entirely in main memory and therefore be fast. This reduces the maximum lag of newly written data for reads. In other words, if a user decides it needs the freshest data for a query, and no version advancement is in progress, the user can start a new version advancement immediately prior to the query, and the data used by the query will be almost current.

Another optimization concerns deadlocked transactions. As described, the AVA3 protocol executes moveToFuture only when a subtransaction access a data item that exists in a future version, or during commit processing. However, subtransactions may be involved in a deadlock and be inactive until the deadlock resolution procedure runs. While inactive, a deadlocked transaction may block version advancement. To prevent this, a node responding to advance-u message may, according to an embodiment of the present invention, signal local update subtransactions waiting for locks to execute moveToFuture immediately.

If version advancements are run as frequently as possible, the upper bound on the staleness of data being read as follows. The AVA3 protocol provides that version advancements to different newu cannot overlap. According to one embodiment of the present invention, the non-overlapping restriction can be relaxed to permit the garbage collection phase to complete in the background, requiring only that the first two phases of version advancement do not overlap. While this may increase the number of copies of the data due to slow garbage collection, still only the latest three copies are used by user transactions.

Consider FIG. 3 again, except assume that the duration of Phase 1 is negligible due to the optimization discussed above. Assume that, immediately after version advancement to update version v+2 completes Phase 2, version advancement to update version v+3 starts. During Phase 2 of version advancement to update version v+2, queries read increasingly obsolete data in version v+1, due to concurrent update transactions executing in version v+2. Once version advancement to update version v+3 starts, it makes current data of version v+2 available for new queries. Since the duration of Phase 2 is bounded by the longest existing query, it can be determined that in this mode, a new query Q operates on a snapshot of the database that may be obsolete by at most the age of the longest query which was executing at the time Q started.

CONCLUSION

The algorithms of Bayer, Heller and Reiser and Stearns and Rosenkrantz never keep more than two versions of data, compared to the three versions of the AVA3 protocol. However, in Bayer, Heller and Reiser, a read-only query may delay the commitment of an update transaction, an update transaction may be aborted because of the versioning mechanism, and read-only queries incur overhead of obtaining read locks. The algorithm of Stearns and Rosenkrantz may, in addition, also delay or abort queries. The algorithm of Weihl requires that read-only transactions write meta-information in the data items they read, and that update transactions write meta-information in all accessed data items at commit time. Thus, these techniques do not satisfy the non-interference requirements.

Several other algorithms have been proposed that satisfy the non-interference requirements. Algorithms of Chan et al., Agrawal and Sengupta, Wu Yu and Chen, Bober and Carey and Mohan, Pirahesh and Lorte address the centralized database, while Chan and Gray extends Chan et al. for the distributed case. While Mohan, Pirahesh and Lorte contains the extension to distributed case, version advancement in the distributed case can interfere with, and cause aborts of, user transactions.

Techniques suggested in Chan et al., Chan and Gray, Agrawal and Sengupta and Bober and Carey achieve the non-interference requirement at the cost of a potentially unlimited number of versions, while the AVA3 protocol creates at most three versions. On the other hand, a read transaction in these protocols always reads the latest version written by an update transaction with an earlier timestamp. In the AVA3 protocol, read transactions access increasingly obsolete data until the next version advancement occurs.

The protocols of Weihl and Chan and Gray modify the commit protocol of update transactions go that participating sites piggyback some information on their prepare messages. In Weihl, this information includes timestamps of all accessed data items and is used to let the transaction coordinator choose a unique timestamp that is greater than all those timestamps. This new timestamp is then sent to participants in the commit message and assigned to the accessed objects. In Chan and Gray, prepare messages carry local committed transaction lists, which are lists of transactions known to the participants to have committed. They are used by the coordinator to compute and distribute to the participants a new list, that includes transactions in all those lists. This how participants to learn about transactions committed by other sites.

In the AVA3 protocol, prepare messages carry the version numbers used by subtransactions, and are used to detect any possible version mis-match. The mis-match is detected by each participant individually by comparing the version it sent with prepare message with the version received with commit message, which is the greatest version reported by any participant. Upon detecting a mis-match, a participant moves the subtransaction into the version received with the commit message by means of moveToFuture function, and then commits.

S. Gukal and E. Omiecinski, "Transient Versioning for Consistency and Concurrency in Client-Server Systems," Proc. 4th IEEE Int. Conf. on Parallel and Distributed Information Systems, pp. 274–285 (1996) proposes a scheme to use old versions cached at the clients as different version of the data, and transactions choose slices in which to execute. A slice is a mutually consistent subset of pages in the database. The server maintains the information which pages belong to which slices, and a directed conflict graph that orders slices according to the serialization order of transactions executed in those slices. When a transaction needs a page that does not currently belong to its slice, the server expands the slice unless it creates a cycle in the slice graph, in which case the transaction is aborted. Generalizing this scheme to a distributed database appears difficult because all servers would have to have a consistent global view on the slice conflict graph.

Agrawal and Sengupta separates concerns of version control and concurrency control, by implementing the versioning mechanism in such a way that it can be used in conjunction with any concurrency control algorithm. The AVA3 protocol is predicated on the use of two-phase locking, and may be used in conjunction with other concurrency control protocols.

For the centralized case, the protocols of Wu, Yu and Chen and Mohan, Pirahesh and Lorte require up to four versions of data to guarantee non-interference of version advancement and user transactions, and the algorithm of Bober and Carey can be configured to require at most four versions. The AVA3 protocol in the centralized case reduces to a scheme that needs at most three versions to provide non-interference. On the other hand, in these protocols, read transactions that start immediately after version advancement always access the latest committed data, and then start falling behind. In the AVA3 protocol, while version advancement makes more recent data available for read transactions, out-of-date data might be accessed even right after version advancement. Since read transactions are allowed to access out-of-date data anyway, this seems to be a small penalty for reducing the number of versions from four to three.

The protocol of H. V. Jagadish, I. S. Mumick and M. Rabinovich, "Scalable Versioning in Distributed Databases with Commuting Updates," 13th IEEE Int. Conf. on Data Engineering, pp. 520–531 (1997) (referred to herein as "Jagadish et al.") targets the case where update transactions commute on individual nodes. For this workload, the protocol creates at most three versions of data and avoids any synchronization delays. The AVA3 protocol can also be applied to commuting updates, though it will lead to some updates becoming available for reads later than in the Jagadish et al. protocol.

The AVA3 protocol may be useful with large distributed database applications having continuous update streams and queries that need access to data. Such large applications typically shut off access to the database while managing version advancement manually, but may prefer to automate the process and provide continuous access to the data. The volume of both updates and queries is so high that the performance of these systems takes precedence (up to a point) over the freshness of the data returned by queries. While queries do not require the very latest data, returning consistent results is desirable. Moreover, the AVA3 protocol is extremely simple. In addition to usual data structures for maintaining multiple versions (which are also simplified due to the fixed number of versions), only a few integers per node and two integers per transaction are maintained.

As database sizes continue to grow, the non-interference requirement may become increasingly common. Indeed, the usual manual versioning that exploits periodic flushing of updates to the read copy will involve ever-longer disruption periods, when user operations are prohibited. On the other hand, existing distributed multi-versioning schemes that satisfy the non-interference requirement may be expensive in a large database due to potentially unlimited number of versions they can create. Not only they consume disk space, but managing versions becomes more complicated in this case.

The AVA3 protocol satisfies the non-interference requirement while creating at most three versions. At the same time, the staleness of data returned by queries can be effectively controlled by the frequency of version advancement. In the limit, with sufficiently frequent version advancement, a query always receives a data snapshot that is never older than the age of the longest concurrently active query. Moving beyond this bound may require additional versions.

Several optimizations are possible to the AVA3 protocol described here. For example, an update transaction can carry a version number with it, and use the maximum of this and the current update version, $u_i$, at a node i, to determine its current update version at site i. By so doing, the number of moves to the future can be decreased. Secondly, for read transactions it suffices if the root subtransaction increments (and later decrements) a transaction counter: there is no need for the child subtransactions to do so. Thirdly, it is the case that read transactions operate on a version only after all updates are done with the version, and version advancement has moved the read version forward. Therefore, the same transaction counter can be used for both read and update, rather than having separate update and query transaction counters for each version at each node.

Although various embodiments are specifically illustrated and described herein, it will be appreciated that modifications and variations of the present invention are covered by the above teachings and within the purview of the appended claims without departing from the spirit and intended scope of the invention. For example, although particular network architectures were used to illustrate the present invention, it can be appreciated that other architectures can be used instead. Similarly, although particular types of database commands have been illustrated, other types of commands will also fall within the scope of the invention. Finally, although software or hardware are described to control certain functions, such functions can be performed using either software, hardware or a combination of software and hardware, as is well known in the art. As is also known, software may be stored on a medium, such as, for example, a hard or floppy disk or a Compact Disk Read Only Memory (CD-ROM), in the form of instructions adapted to be executed by a processor. The instructions may be stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

What is claimed is:

1. A method of database version advancement in a database distributed among a plurality of nodes, comprising:

executing read transactions using a first version of a database;

executing update transactions such that information is written into a second version of the database, wherein the second version may include less than all of the information contained in the first version;

beginning to advance a database version at each node such that the information in the second version becomes available for read transactions, and such that each node advances asynchronously with respect to other nodes;

for an update transaction that starts on a node after the database version has been advanced, executing the update transaction such that the update transaction writes information into a third version of the database; and completing the advancement of the database version such that the second version becomes the first version and the third version becomes the second version.

2. The method of claim 1, wherein an update transaction, starting on a node before the database version has been advanced, is executed using information in the second version if the information is not available in the third version.

3. The method of claim 2, wherein the update transaction, starting on the node before the database version has been advanced, is executed using information in the third version if the information is available in the third version, and wherein any other update previously executed by that update transaction is transferred from the second version to the third version.

4. The method of claim 3, wherein other updates are transferred from the second version to the third version using a moveToFuture function.

5. The method of claim 1, wherein each node stores transaction counters, comprising a query counter and an update counter, for each active database version.

6. The method of claim 5, wherein the transaction counters are stored in a volatile main memory.

7. The method of claim 5, wherein each node further stores an update version number, a query version number and a garbage version number.

8. The method of claim 1, wherein each transaction has subtransactions, each read and update subtransaction $T_i$, where i represents one of the plurality of nodes, maintains a version number $V(T_i)$ that specifies the version of the information being accessed.

9. The method of claim 1, further comprising:

after completing the advancement of the database version, deleting the original first version of the database at each node.

10. The method of claim 9, wherein the original first version of the database at each node is only deleted when all read transactions using the original first version have completed.

11. The method of claim 1, wherein said beginning to advance the database version is performed periodically.

12. The method of claim 11, wherein (1) the read transactions do not interfere with the update transactions; (2) a transaction is never delayed on account of version advancement; (3) the read transactions do not require a lock and do not update information in accessed data items; and (4) only a finite number of database versions are required.

13. The method of claim 1, wherein said beginning to advance the database version is performed when a pre-determined number of update transactions have been executed.

14. The method of claim 1, wherein said beginning to advance the database version is performed when information in the second version differs from information in the first version by a pre-determined amount.

15. A method of database version advancement in a centralized database, comprising:

executing read transactions using a first version of a database;

executing update transactions such that update transactions write information into a second version of the database, wherein the second version may include less than all of the information contained in the first version;

beginning to advance a database version such that the information in the second version becomes available for read transactions;

for an update transaction that accesses information having a database version that was advanced, executing the update transaction such that the update transaction writes information into a third version of the database; and completing the advancement of the database version such that the second version becomes the first version and the third version becomes the second version.

16. The method of claim 15, wherein (1) the read transactions do not interfere with the update transactions; (2) a transaction is never delayed on account of version advancement; (3) the read transactions do not require a lock and do not update information in accessed data items; and (4) only a finite number of database versions are required.

17. The method of claim 15, wherein (1) the read transactions do not interfere with the update transactions; (2) a transaction is never delayed on account of version advancement; (3) the read transactions do not require a lock and do not update information in accessed data items; and (4) only a finite number of database versions are required.

18. A method of database version advancement for a database distributed among a plurality of nodes, comprising:

executing read transactions using a first version of a database;

executing update transactions such that update transactions write information into a second version of the database, wherein the second version may include less than all of the information contained in the first version;

for an update transaction that starts on a node after a database version has been advanced, executing the update transaction such that the update transaction writes information into a third version of the database; and advancing the database version such that the non-interference requirement is satisfied.

19. An article of manufacture comprising a computer-readable medium having stored thereon instructions adapted to be executed by a processor, the instructions which, when executed, define a series of steps for database version advancement in a database distributed among a plurality of nodes, said steps comprising:

executing read transactions using a first version of a database;

executing update transactions such that information is written into a second version of the database, wherein the second version may include less than all of the information contained in the first version;

beginning to advance a database version at each node such that the information in the second version becomes available for read transactions;

for an update transaction that starts on a node after the database version has been advanced, executing the update transaction such that the update transaction writes information into a third version of the database; and completing the advancement of the database version such that the second version becomes the first version and the third version becomes the second version.

20. The article of claim 19, wherein (1) the read transactions do not interfere with the update transactions; (2) a transaction is never delayed on account of version advancement; (3) the read transactions do not require a lock and do not update information in accessed data items; and (4) only a finite number of database versions are required.

21. An apparatus for storing a database distributed among a plurality of nodes, comprising:

means for executing read transactions using a first version of a database;

means for executing update transactions such that information is written into a second version of the database, wherein the second version may include less than all of the information contained in the first version;

means for beginning to advance a database version at each node such that the information in the second version becomes available for read transactions;

means for executing an update transaction such that the update transaction writes information into a third version of the database when the update transaction starts on a node after the database version has been advanced; and means for completing the advancement of the database version such that the second version becomes the first version and the third version becomes the second version.

22. The apparatus of claim 21, wherein (1) the read transactions do not interfere with the update transactions; (2) a transaction is never delayed on account of version advancement; (3) the read transactions do not require a lock and do not update information in accessed data items; and (4) only a finite number of database versions are required.

23. An apparatus for storing a database, comprising:

a plurality of nodes, at least one of said nodes comprising:
a processor adapted to (i) execute read transactions using a first version of a database; (ii) execute update transactions such that information is written into a second version of the database, wherein the second version may include less than all of the information contained in the first version; (iii) begin to advance a database version at each node such that the information in the second version becomes available for read transactions; (iv) for an update transaction that starts on a node after the database version has been advanced, executing the update transaction such that the update transaction writes information into a third version of the database; and (v) completing the advancement of the database version such that the second version becomes the first version and the third version becomes the second version.

24. The method of claim 23, wherein (1) the read transactions do not interfere with the update transactions; (2) a transaction is never delayed on account of version advancement; (3) the read transactions do not require a lock and do not update information in accessed data items; and (4) only a finite number of database versions are required.

* * * * *